United States Patent Office 3,538,160
Patented Nov. 3, 1970

1

3,538,160
PENTACYCLOOCTANEAMINES
George L. Dunn, Wayne, and John R. E. Hoover, Glenside, Pa., assignors to Smith Kline & French Laboratories, Philadelphia, Pa., a corporation of Pennsylvania
No Drawing. Application Jan. 6, 1966, Ser. No. 519,021, now Patent No. 3,418,368, dated Dec. 24, 1968, which is a continuation-in-part of application Ser. No. 424,775, Mar. 24, 1965. Divided and this application July 24, 1968, Ser. No. 747,127
Int. Cl. A61k *27/00;* C07c *87/40*
U.S. Cl. 260—563                                    4 Claims

ABSTRACT OF THE DISCLOSURE

Pentacyclo[4.2.0.0$^{2,5}$.0$^{3,8}$.0$^{4,7}$]octanes, pentacyclo[5.2.0.0$^{2,5}$.0$^{3,9}$.0$^{4,8}$]nonanes and pentacyclo[6.2.0.0$^{2,6}$.0$^{3,10}$.0$^{5,9}$]decanes, substituted with an amino or amino group, are prepared from known simpler substances. The products are antiviral agents.

This application is a division of copending application Ser. No. 519,021, filed Jan. 6, 1966, now U.S. Pat. No. 3,418,368, which is a continuation-in-part of our copending application Ser. No. 422,475, filed Mar. 24, 1965, now abandoned.

This invention relates to polycyclic compounds having antiviral activity and to intermediates therefor. In particular, the invention relates to pentacyclooctanes, nonanes, and decanes, substituted with an amino or aminomethyl group, and to intermediate carboxylic acids.

The product compounds of the invention have one of the following structural formulas:

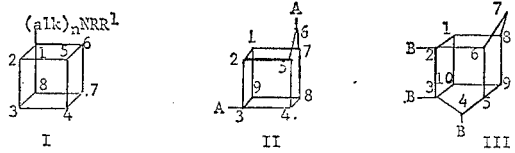

where one A group is (alk)$_n$NRR$^1$ and the other A groups are hydrogen;
one B group is (alk)$_n$NRR$^1$ and the other B groups are hydrogen;
alk is

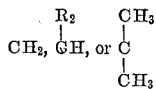

$n$ is 0 or 1;
R is hydrogen or lower alkyl;
R$^1$ is hydrogen, lower alkyl, lower acyl, carbamoyl, guanyl, or COOR$^3$;
R$^2$ is lower alkyl of 1 to 4 carbon atoms; and
R$^3$ is lower alkyl or aralkyl.

The term lower alkyl is intended to represent those alkyl groups having up to about five carbon atoms therein. The term lower acyl is intended to represent those groups having up to about seven carbon atoms therein. The term aralkyl is intended to represent those groups having up to about nine carbon atoms therein, particularly benzyl.

2

The compounds of Formula I are named as 1-amino or aminomethyl pentacyclo[4.2.0.0$^{2,5}$.0$^{3,8}$.0$^{4,7}$]octanes. The compounds of Formula II are named as 3 or 6-amino or 3 or 6-aminomethyl pentacyclo[5.2.0.0$^{2,5}$.0$^{3,9}$.0$^{4,8}$]nonanes. The compounds of Formula III are named as 2, 3 or 4-amino or 2, 3, or 4-aminomethyl pentacyclo[6.2.0.0$^{2,6}$.0$^{3,10}$.0$^{5,9}$]decanes. The aminomethyl compounds may also be named as methylamines.

The product compounds of this invention possess antiviral activity, particularly against influenza viruses.

Compounds of Formula I in which $n$ is 0 are prepared from pentacyclo[4.2.0.0$^{2,5}$.0$^{3,8}$.0$^{4,7}$]octane - 1 - carboxylic acid [P. Eaton et al., J. Am. Chem. Soc., 86, 3157 (1964)]. The acid is converted to its acid chloride by means of thionyl chloride or other reagent capable of converting an acid to an acid chloride, an azide is prepared by treatment with a metal azide such as sodium azide. The azide is heated, preferably in an inert solvent such as benzene or toluene, to give an isocyanate, and hydrolysis with a mineral acid such as hydrochloric acid converts the isocyanate to a primary amine (I, $n$=O, R and R$^1$=H).

Compounds where R and/or R$^1$ are other than hydrogen are prepared in the following manner. The primary amine is treated with an acyl halide or anhydride in the presence of a base such as pyridine to give an acylamine. Certain acylamines may be treated with lithium aluminum hydride to give an alkyl amine or may be alkylated with a lower alkyl halide or sulfate in the presence of sodium hydride to give an acylalkylamine, and if desired reduced further with lithium aluminum hydride to give a dialkylamine. A methylamine is prepared by treating the intermediate isocyanate with methanol, followed by lithium aluminum hydride reduction. A dimethylamine is prepared by heating a primary amine with formic acid and formaldehyde. A urea derivative (I, $n$=O, R=H, R$^1$=carbamoyl) is prepared by treating the primary amine with potassium cyanate. A guanidine derivative (I, $n$=O, R=H, R$^1$=guanyl) is prepared by treating the primary amine with S-methylisothiourea sulfate. A compound in which R$^1$ is COOR$^3$ may be prepared by treating an isocyanate with an alcohol of the formula R$^3$OH.

Compounds of Formula I in which $n$ is 1 and alk is CH$_2$ are prepared by treating the acid chloride described above with aqueous or anhydrous ammonia to give the amide. The amide is then reduced to the aminomethyl compound (I, $n$=1, R and R$^1$=H) by reduction with a reagent such as lithium aluminum hydride. Use of primary or secondary amines in place of ammonia gives N-substituted aminomethyl compounds.

Compounds of Formula I in which $n$ is 1 and alk is

are prepared by treating the carboxylic acid with a lower alkyl lithium to give the alkyl ketone, forming the oxime, and then reducing the oxime with lithium aluminum hydride or catalytically.

Compounds in which alk is

are prepared by treating the acid chloride with methyl magnesium bromide to give the α,α-dimethylmethanol, performing a Ritter reaction with acetonitrile and sulfuric acid to give the N-acetyl-α,α-dimethylmethylamine, and hydrolyzing the acetyl group with a reagent such as potassium hydroxide.

The above aminomethyl products are alkylated or acylated by the same methods as are used for the amino compounds.

The 3-aminopentacyclo[5.2.0.0$^{2,5}$.0$^{3,9}$.0$^{4,8}$]nonanes of Formula II in which $n$ is 0 are prepared according to the procedure illustrated in Chart A, below.

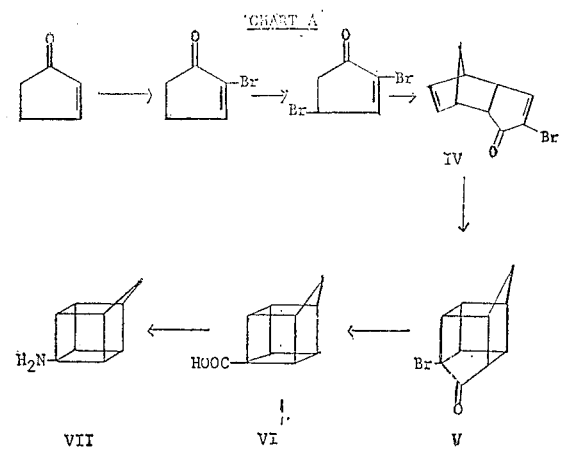

2-cyclopentenone is brominated with an equimolar amount of bromine to give 2-bromo-2-cyclopentenone. Further bromination with a bromoimide such as N-bromosuccinimide leads to 2,4-dibromo-2-cyclopentenone. Diels-Alder reaction with cyclopentadiene results in the formation of 2-bromo-3a,4,7,7a-tetrahydro-4,7-methanoinden-1-one (IV). This tricyclic compound is ring-closed to the bromo pentacyclic compound V by irradiation with ultraviolet light. When this compound is heated with potassium hydroxide solution, a Favorski rearrangement occurs to give the pentacyclic acid VI. This acid, useful as an intermediate compound, is considered part of the present invention. The acid is then converted to the primary amine VII by the same Curtius-type procedure as is used for the amino compound of Formula I. The primary amine is converted to various derivatives by the same procedures as described above.

For the preparation of compounds of Formula II in which $n$ is 1 and alk is

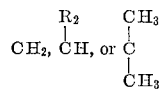

the acid VI or its acid chloride as appropriate is subjected to the same sequences of reaction as are described above for the preparation of compounds of Formula I, where $n$ is 1. The N-alkyl or acyl compounds are also prepared by the above-described conventional methods.

The 3-aminopentacyclo[5.2.0.0$^{2,5}$.0$^{3,9}$.0$^{4,8}$]nonanes of Formula II in which $n$ is 0 are also prepared according to the procedure illustrated in Chart B, below.

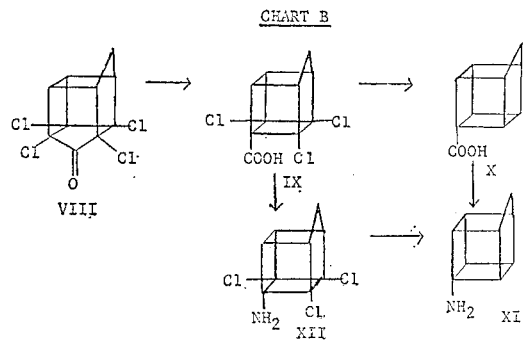

3,5,9,10 - tetrachloropentacyclo[6.2.0.0$^{2,6}$.0$^{3,10}$.0$^{5,9}$] decan-4-one [VIII, P. Yates et al., Tetrahedron, 12, 13–22 (1961)] is heated with a strong base such as sodium hydroxide in benzene to accomplish a rearrangement to the trichloro acid IX. This compound is converted to the 3-amino compound XI by either of two methods. Conversion of the acid directly to an amine by means of the above-described Curtius azide-isocyanate series of reactions yields the trichloroamine XII, which is dechlorinated to XI with lithium in tert-butyl alcohol. Compound XII, useful as an intermediate for the preparation of the active compound XI, is considered part of the present invention, as is the acid IX. Alternatively, the trichloro acid IX is first dechlorinated to the acid X, and this acid is then converted to the amine. Formation of various substituted amine derivatives as well as the compounds in which $n$ is 1 is accomplished as described above from the acid X.

The 6 - aminopentacyclo[5.2.0.0$^{2,5}$.0$^{3,9}$.0$^{4,8}$]nonanes of Formula II, in which $n$ is 0, are prepared according to the procedure illustrated in Chart C, below.

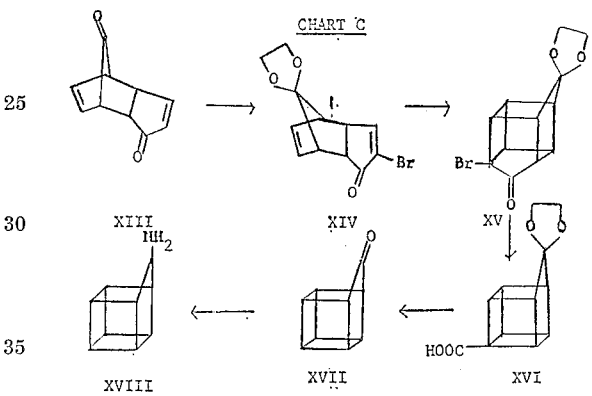

Dicyclopentadiene-1,8-dione (XIII) is brominated with bromine and monoketalized at the 8-keto group to give compound XIV. Irradiation with ultraviolet light gives the bromo keto ketal XV, which, when treated with aqueous potassium hydroxide or other strong base, gives the rearranged acid ketal XVI. This compound is decarboxylated by heating the tert-butyl perester in cymene and the ketal hydrolized to the ketone XVII. The ketone is converted to an oxime by reaction with hydroxylamine or a salt thereof, and the oxime reduced to the amine XVIII by lithium aluminum hydride or by catalytic means.

For the preparation of compounds where $n$ is 1 the ketone XVII is converted to a carboxylic acid as follows: The ketone is treated with methoxymethylene triphenylphosphorane, generated from methoxymethyl triphenylphosphonium chloride and butyl lithium in solvents such as tetrahydrofuran and diglyme. The resulting 6-methoxymethylene compound is then converted to the 6-carboxaldehyde by means of a strong acid such as perchloric or hydrochloric, and the aldehyde oxidized to the 6-carboxylic acid with silver nitrate. The acid is converted to the various compounds in which $n$ is 1 by procedures described above.

The 2 - aminopentacyclo[6.2.0.0$^{2,6}$.0$^{3,10}$.0$^{5,9}$]decanes of Formula III are prepared according to the procedure illustrated in Chart D, below.

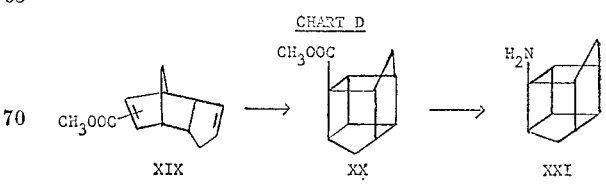

A solution of methyl dicyclopentadiene-5(or 6)-carboxylate [XIX, D. Peters, J. Chem. Soc., 1037 (1961)]

in a solvent such as acetone is irradiated with ultraviolet light to give the ring-closed ester XX. The ester is hydrolyzed to its acid, which as a useful intermediate is considered part of the present invention, with a basic reagent such as potassium hydroxide and then converted to the amine XXI by the Schmidt reaction, i.e., hydrazoic acid in sulfuric acid.

Conversion of the carboxylic acid to the amide, via the acid chloride, followed by reduction of the amide with lithium aluminum hydride, gives the aminomethyl compound ($n$ is 1, alk is $CH_2$). Compounds in which alk is

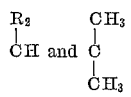

are prepared by means already disclosed.

The 3 - aminopentacyclo[$6.2.0.0^{2,6}.0^{3,10}.0^{5,9}$]decanes of Formula III are prepared according to the procedure illustrated in Chart E, below.

CHART E

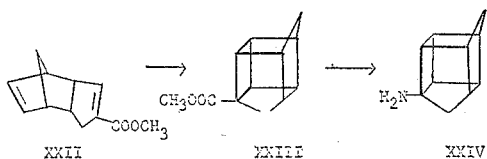

XXII    XXIII    XXIV

A solution of methyl dicyclopentadiene-2-carboxylate [XXII, D. Peters, J. Chem. Soc., 1037, (1961)] in a solvent such as acetone is irradiated with ultraviolet light to give the ester XXIII. This ester is hydrolyzed with a base such as potassium hydroxide and the resulting acid, which is part of this invention, is then converted to the amine XXIV by means of a Schmidt reaction, as described above.

Conversion of the carboxylic acid to the various compounds in which $n$ is 1 is achieved by methods described above.

The 4 - aminopentacyclo[$6.2.0.0^{2,6}.0^{3,10}.0^{5,9}$]decanes of Formula III in which $n$ is O are prepared according to the procedure illustrated in Chart F, below.

CHART F

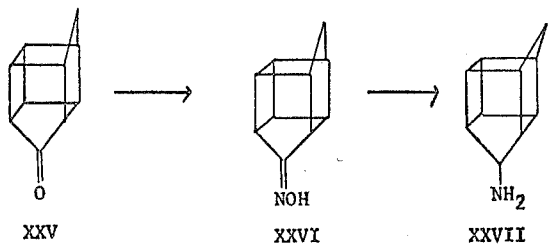

O        NOH       $NH_2$
XXV      XXVI      XXVII

Pentacyclo[$6.2.0.0^{2,6}.0^{3,10}.0^{5,9}$]decan-4-one [XXV, Tetrahedron Letters, 29 (1960)] is converted to the oxime XXVI by reaction with hydroxylamine. Reduction of the oxime with lithium aluminum hydride gives the amine XXVII. Compounds in which $n$ is 1 are prepared by converting the ketone XXV into a carboxylic acid and then carrying out the previously-described series of reactions on this acid.

It will be evident that the basic amino compounds of the present invention can be converted into their non-toxic, pharmaceutically acceptable acid addition salts by standard techniques, e.g. addition of the acid or a solution thereof to a solution of the basic amino compound in an organic solvent such as ether, alcohol, or acetone. Such salts include, but are not limited to, the hydrochloride, sulfate, hydrobromide, citrate, pamoate, maleate, cyclohexylsulfamate, nitrate, acetate, tartrate, and succinate. Such salts are part of the present invention and are full equivalents of the free bases.

It is also obvious to one skilled in the art of chemistry that quaternary salts can be formed by treatment of the amino compounds of the invention with an alkyl halide, sulfate, or sulfonate. Such quaternary salts are also considered part of the present invention.

Treatment of the tertiary amines of the invention in known manner with hydrogen peroxide produces amine oxides. Such amine oxides derived from compounds of the invention are considered the full equivalents thereof.

Certain of the amine compounds of the invention are best prepared by treatment of a carboxylic acid with hydrazoic acid in sulfuric acid in a Schmidt reaction. Other amine compounds are best prepared by conversion of the carboxylic acid to its acid chloride, preparation of the azide by treatment with a metal azide, pyrolysis to an isocyanate, and then hydrolysis to the amine. This latter procedure constitutes the Curtius reaction. Although the procedures described are the best known to the inventors, it should be understood that any of the carboxylic acids described herein may be converted to the corresponding amines either by the Curtius reaction or the Schmidt reaction.

An alternative method for the preparation of pentacyclo primary amines involves the treatment of an isocyanate with benzylamine and hydrogenolysis of the resulting carbobenzyloxyamine.

Since the carbon atoms to which the amino or aminomethyl groups are attached are asymmetric carbon atoms in the compounds of Formula III, it will be apparent that the product compounds having these structures will exist in the form of racemic mixtures. Inasmuch as separation of racemic mixtures by various methods is known to the art of organic chemistry, the present invention is intended to embrace both the racemic mixtures and the separated optically active forms.

The structures of the compounds described herein have been determined by means of elemental analysis and spectrographic analysis, as well as from a knowledge of the starting materials and the nature of the reactions employed.

The antiviral pentacyclic amines of the present invention are active against influenza viruses, particularly Asian and swine influenza viruses. They are effective in infected mice at doses of 6.25–100 mg./kg. when administered orally and subcutaneously in the form of aqueous solutions of their hydrochloric salts.

The following examples are intended to illustrate the preparation of the compounds of the invention, but are not to be construed as limiting the scope thereof.

EXAMPLE 1

1-aminopentacyclo[$4.2.0.0^{2,5}.0^{3,8}.0^{4,7}$]octane

A solution of pentacyclo[$4.2.0.0^{2,5}.0^{3,8}.0^{4,7}$]octane-1-carboxylic acid (1 g.) in 10 ml. of thionyl chloride is allowed to stand for 18 hours at room temperature. Evaporation of the excess thionyl chloride in vacuo gives the acid chloride. The acid chloride is dissolved in 60 ml. of acetone and treated with a solution of 0.75 g. of sodium azide in 7.5 ml. of water at 0–5°. After stirring at 0–5° for 30 minutes, the mixture is diluted with water (80 ml.), extracted with benzene, and the combined benzene extracts dried over anhydrous magnesium sulfate. The benzene solution is heated at reflux for 1 hour and the solvent removed in vacuo to give the isocyanate. The isocyanate is heated in a refluxing solution of concentrated hydrochloric acid (12 ml.) in tetrahydrofuran (50 ml.) for 1 hour and 15 minutes. The solution is cooled, concentrated to one-fourth volume in vacuo and diluted with water (30 ml.). After extraction with ether, the aqueous layer is basified with 10% aqueous sodium hydroxide. The cloudy solution is extracted with ether (3 × 20 ml.), the combined extracts dried and evaporated to give the title product. The hydrochloride salt is prepared by dissolving the base in ether and treating the solution with excess ethereal hydrogen chloride. The white precipitate is collected to give the salt. Recrystallization from isopropyl alcohol-ethyl acetate gives the pure salt.

EXAMPLE 2

3-aminopentacyclo[5.2.0.0$^{2,5}$.0$^{3,9}$.0$^{4,8}$]nonane

To a cold (0°) solution of 2-cyclopentenone (82 g., 1 mole) in 500 ml. of carbon tetrachloride is added dropwise a solution of bromine (160 g., 1 mole) in 500 ml. of carbon tetrachloride during 45 minutes. After stirring for 5 minutes, a solution of triethylamine (210 ml.) in 500 ml. of carbon tetrachloride is added during 45 minutes at 0°. When addition is complete, the mixture is stirred at room temperature for 2 hours. The triethylammonium bromide is removed by filtration and washed with carbon tetrachloride. The combined filtrate and washings are extracted with dilute hydrochloric acid (4× 250 ml.) and water (250 ml.), and finally dried over anhydrous magnesium sulfate. The solvent is removed at 40° in vacuo and the residue distilled to give 79 g. of 2-bromo-2-cyclopentenone, B.P. 60–65°/0.5 mm. One recrystallization from ether-hexane gives 63 g. of pure product, M.P. 39–39.5°, $\lambda^{95\% \text{EtOH}}_{\text{max.}}$ 238 m$\mu$ ($\epsilon$ 8470).

A mixture consisting of 2-bromo-2-cyclopentenone (80 g., 0.50 mole), N-bromosuccinimide (98 g., 0.55 mole) and azo-bis-isobutyronitrile (ABIN) (2.5 g.) in 1 l. of carbon tetrachloride is heated at reflux. Additional 1 g. portions of ABIN are added after 3 hours and 7 hours, and refluxing continued for a total of 24 hours. The mixture is cooled to room temperature, succinimide removed by filtration and washed with carbon tetrachloride. The combined filtrate and washings are extracted with 5% aqueous sodium bicarbonate and water, and then dried over anhydrous magnesium sulfate. Removal of the solvent in vacuo at 25° gives 2,4-dibromo-2-cyclopentenone.

To a solution of freshly distilled cyclopentadiene (570 ml.) and triethylamine (145 ml.) in 1 l. of anhydrous ethyl ether cooled to −10° is added during 2 hours a solution of the above dibromo compound (118 g.) in 2 l. of anhydrous ethyl ether. The mixture is stirred for 15 minutes after addition is complete and then filtered to remove precipitated triethylammonium bromide (75 g., 82%). The filtrate is washed with dilute hydrochloric acid, water, 5% aqueous sodium bicarbonate and finally with water. The dried ether solution is evaporated in vacuo to give a residual oil. Chromatography on 6 lbs. of neutral alumina (Woelm, activity grade I) and elution with benzene (32 l.) and 1:1 benzene-chloroform (10 l.) gives a low-melting solid. Recrystallization from petroleum ether gives 2-bromo-3a,4,7,7a-tetrahydro-4,7-methanoinden-1-one, M.P. 56–57°.

A solution of 2-bromo-3a,4,7,7a-tetrahydro-4,7-methanoinden-1-one (24 g.) in 1 l. of ethyl acetate is irradiated in a Pyrex immersion photolysis apparatus for 32 hours with a 450 watt Hanovia Hg vapor lamp. The dark solution is evaporated in vacuo to give a dark residue which is heated with boiling petroleum ether. Any insoluble solid present is filtered off, the petroleum ether filtrate treated with activated charcoal and finally cooled in a freezer. The precipiated colorless solid is collected to give 3 - bromopentacyclo[6.2.0.0$^{2,6}$.0$^{3,10}$.0$^{5,9}$]decan - 4 - one, M.P. 39–40°.

3-bromopentacyclo[6.2.0.0$^{2,6}$.0$^{3,10}$.0$^{5,9}$]decan-4-one (21 g.) is dissolved in 350 ml. of hot 30% aqueous potassium hydroxide and the solution heated at reflux for 4 hours. The solution is cooled, extracted with ether and then the alkaline layer acidified with dilute hydrochloric acid. The acidic solution containing a precipitate is extracted with ether, the combined ether extracts dried over anhydrous magnesium sulfate and finally evaporated to give pentacyclo[5.2.0.0$^{2,5}$.0$^{3,9}$.0$^{4,8}$]nonane-3 - carboxylic acid, M.P. 92–93°. Further purification is accomplished by sublimation or recrystallizatiton from petroleum ether, M.P. 92–93°.

A solution of pentacyclo[5.2.0.0$^{2,5}$.0$^{3,9}$.0$^{4,8}$]nonane-3-carboxylic acid (1.16 g., 2.2 mmoles) in 5 ml. of thionyl chloride is allowed to stand at room temperature for 18 hours and then heated for 1 hour at reflux. Excess thionyl chloride is removed in vacuo and the remaining liquid acid chloride dissolved in 60 ml. of acetone and treated with a solution of sodium azide (0.75 g.) in 7.5 ml. of water at 0–5°. After stirring at 0–5° for 30 minutes, the mixture is diluted with water (80 ml.), extracted with benzene, and the combined benzene extracts dried over anhydrous magnesium sulfate. The benzene solution is heated at reflux for 1 hour and the solvent removed in vacuo to give the isocyanate. The isocyanate is heated in a refluxing solution of concentrated hydrochloric acid (12 ml.) in tetrahydrofuran (50 ml.) for 1 hour and 15 minutes. The solution is cooled, concentrated to one-fourth volume in vacuo and diluted with water (30 ml.). After extraction with ether, the aqueous layer is basified with 10% aqueous sodium hydroxide. The cloudy solution is extracted with ether (3× 20 ml.), the combined extracts dried and evaporated to give the title 3-amino-penacyclononane compound. A hydrochloride salt is prepared by dissolving the base in ether and then treating the solution with excess ethereal hydrogen chloride. The white precipitate is collected to give the crude salt. Recrystallization from isopropyl alcohol-ethyl acetate gives the pure salt, M.P. 188–9° dec.

EXAMPLE 3

3-aminopentacyclo[5.2.0.0$^{2,5}$.0$^{3,9}$.0$^{4,8}$]nonane

A mixture of powdered sodium hydroxide (2 g.) in benzene (200 ml.) is heated at reflux under a Dean-Stark trap for 1 hour. 3,5,9,10-tetrachloropentacyclo[6.2.0.0$^{2,6}$.0$^{3,10}$.0$^{5,9}$]decan-4-one (2.84 g., 0.01 moles) is added and the mixture heated at reflux for 18 hours. The mixture is cooled, 150 ml. of water added and the layers separated. The aqueous layer is acidified with dilute hydrochloric acid, extracted with ether and the combined extracts dried. Evaporation of the solvent in vacuo gives a tan solid. The tan solid (2.1 g.) is dissolved in a slight excess of 5% aqueous sodium hydroxide, then the pH is adjusted to 3.5 by gradual addition of hydrochloric acid. After cooling (5°) and stirring for 1 hour, the white precipitate is collected to give 4,8,9-trichloropentacyclo[5.2.0.0$^{2,5}$.0$^{3,9}$.0$^{4,8}$]nonane-2-carboxylic acid, M.P. 214–216°.

A solution of 4,8,9-trichloropentacyclo[5.2.0.0$^{2,5}$.0$^{3,9}$.0$^{4,8}$]nonane-3-carboxylic acid (5 g.) in 75 ml. of thionyl chloride is heated at reflux for 3 hours. Excess thionyl chloride is removed by heating in vacuo to give 5.1 g. of solid acid chloride. This is dissloved in 180 ml. of acetone, cooled in ice and a solution of sodium azide (1.6 g.) in 16 ml. of water added. After stirring 15 minutes, the suspension is diluted with 270 ml. of water and extracted with ether. The dried ether extracts then are evaporated at 25° in vacuo to give 4.0 g. of acyl azide. The azide is dissolved in 150 ml. of benzene, heated at reflux for 1 hour, and evaporated in vacuo to give 4.0 g. of isocyanate as a pale yellow syrup. The isocyanate is dissolved in a mixture of tetrahydrofuran (160 ml.) and concentrated hydrochloric acid (40 ml.) and the solution heated at reflux for 1 hour. Tetrahydrofuran is removed in vacuo, the resulting aqueous solution extracted with ether, and the aqueous solution basified with 10% aqeous sodium hydroxide. The turbid mixture is extracted with ether, the combined extracts dried and evaporated to give the title product. A sample of this product is dissolved in ether and excess ethereal hydrogen chloride added to give a white precipitate. The pure hydrochloride salt melts at 188–193° dec.

The free base is generated by dissolving the hydrochloride in water, basifying with 10% aqueous sodium hydroxide, extraction with ether and evaporation of the dried extracts to give a white solid. Two recrystallizations from hexane gives pure 3-amino-4,8,9-trichloropentacyclo[5.2.0.0$^{2,5}$.0$^{3,9}$.0$^{4,8}$]nonane, M.P. 89–91° dec.

To a solution of 4,8,9-trichloropentacyclo[5.2.0.0$^{2,5}$.0$^{3,9}$.0$^{4,8}$]nonane-3-carboxylic acid (10.6 g., 0.04 mole) in 200 ml. of dry tetrahydrofuran and tert-butyl alcohol (17.8 g., 0.24 mole) is added lithium wire (3.3 g., 0.48 mole) in small pieces. After 5 minutes the mixture becomes warm and finally refluxes spontaneously for about 15 minutes. As the spontaneous reaction subsides, heat is applied to maintain reflux for another 15 minutes. The mixture is cooled, 12 ml. of tert-butyl alcohol and 1.7 g. of lithium were added and the mixture heated at reflux for 3 hours. The reaction mixture is poured into 1 l. of ice water and after excess lithium has decomposed, is washed with ether. The aqueous layer is acidified with concentrated hydrochloric acid, extracted with ether and the combined dried extracts evaporated in vacuo to the title product, M.P. 66–69°, 5.1 g. The acid is dissolved in ether, treated with excess cyclohexylamine and the precipitate collected to give pentacyclo[5.2.0.0$^{2,5}$.0$^{3,9}$.0$^{4,8}$]nonane-3-carboxylic acid as its cyclohexylamine salt, M.P. 192–194°.

Pentacyclo[5,2.0.0$^{2,5}$.0$^{3,9}$.0$^{4,8}$]nonane-3-carboxylic acid (4.64 g., 0.029 mole) is dissolved in 20 ml. of thionyl chloride and the mixture allowed to stand overnight at room temperature. Excess thionyl chloride is removed in vacuo to give 5.4 g. of crude acid chloride. The acid chloride is dissolved in acetone (250 ml.), cooled to 5° and a solution of sodium azide (3 g.) in 25 ml. of water added. After stirring for 20 minutes, the suspension is diluted with water (350 ml.), extracted with benzene and the combined extracts dried over magnesium sulfate. The benzene solution is heated at reflux for 1.5 hours, then evaporated in vacuo to a yellow-brown liquid isocyanate. The isocyanate is dissolved in a mixture of acetic acid (250 ml.) and dilute (4:1) hydrochloric acid and the mixture heated at reflux for 18 hours. The solution is evaporated in vacuo to a sticky dark residue which is boiled with a mixture of water (250 ml.) and dilute hydrochloric acid, treated with activated carbon and after cooling, basified with 10% aqueous sodium hydroxide solution. The mixture is extracted with ether and the combined dry extracts evaporated to give the title 4-aminopentacyclononane product. Treatment of an ether solution of the product with ethereal hydrogen chloride gives the hydrochloride salt, recrystallized from ethanol-ethyl acetate, M.P. 175–8° dec.

EXAMPLE 4

6-aminopentacyclo[5.2.0.0$^{2,5}$.0$^{3,9}$.0$^{4,8}$]nonane

To a suspension of dicyclopentadiene-1,8-dione (55 g.) [Chem. Ber, 94, 2909 (1961)] in 2.5 liters of carbon tetrachloride, cooled to 5°, is added a solution of bromine (55 g.) in 520 ml. of carbon tetrachloride. The resulting solution is allowed to stand overnight at room temperature. The solvent is removed by heating in vacuo and the residual solid taken up in ether-ethyl acetate.

Cooling and scratching gives 2-bromodicyclopentadiene-1,8-dione, M.P. 122–124°. A second crop is obtained by evaporating the filtrate and recrystallizing the residue from ether-hexane, M.P. 120–122°.

A solution of 2-bromodicyclopentadiene-1,8-dione (10.4 g.) in 165 ml. of benzene containing ethylene glycol (5.4 g.) and p-toluenesulfonic acid monohydrate (0.25 g.) is heated at reflux under a Dean-Stark trap for 18 hours. The reaction is cooled, washed with aqueous sodium bicarbonate and water, and then dried. The residue after removing the solvent in vacuo is taken up in acetone (50 ml.) and 6 N hydrochloric acid (30 ml.) and stirred at room temperature for 30 minutes. (This procedure hydrolyses the diketal impurity to the monoketal.) The mixture is poured into water (700 ml.) and the solid 8-monoketal collected, M.P. 94–97°.

A solution of 2-bromodicyclopentadien-1,8-dione, 8-ethylene ketal (23.5 g.) in 1650 ml. of dry benzene is irradiated in a Pyrex apparatus with a Hanovia 450 watt ultraviolet lamp for 52 hours. An insoluble material is removed by filtration and the benzene removed by heating in vacuo. The residue is heated in boiling hexane for a few minutes and the solvent decanted from any insoluble material. This process is repeated until a total of 1200 ml. of hexane has been used. Cooling and scratching induces the crystallization of 3-bromopentacyclo[6.2.0.0$^{2,6}$.0$^{3,10}$.0$^{5,9}$]decan-4,7-dione, 7-ethylene ketal, M.P. 96–98°.

A solution of 3-bromopentacyclo[6.2.0.0$^{2,6}$.0$^{3,10}$.0$^{5,9}$]decan-4,7-dione, 7-ethylene ketal (12.3 g.) in 125 ml. of 10% aqueous potassium hydroxide solution is heated at reflux with stirring for 2 hours. The cold solution is extracted with ether, acidified with concentrated hydrochloric acid, extracted with ether and the combined extracts dried. Evaporation of the solvent gives a semisolid residue which is crystallized from hexane to give pentacyclo[5.2.0.0$^{2,5}$.0$^{3,9}$.0$^{4,8}$]nonan-6-one - 3 - carboxylic acid, 6-ethylene ketal, M.P. 85–86°.

A sample of the above described ketal acid (5 g.) is dissolved in thionyl chloride (20 ml.) and allowed to stand overnight at room temperature. Excess thionyl chloride is removed by heating (40°) in vacuo and the residue distilled to give the pure acid chloride.

To a solution of tert-butyl hydroperoxide (2.4 g.) and pyridine (2 g.) in 40 ml. of dry pentane at 5° is added dropwise over 1 hour a solution of 4 g. of acid chloride in 30 ml. of pentane. After stirring at 0° for 1 hour, cold 10% sulfuric acid is added and the pentane layer washed with cold 10% sulfuric acid and 10% sodium bicarbonate solutions. After drying, the pentane is removed in vacuo and the perester obtained.

The perester (4 g.) obtained above is dissolved in 25 ml. of p-cymene and heated at 115 to 140° for 2 hours. The solution then is distilled until the head temperature is about 176°. The decarboxylated ketal product is isolated by preparative gas chromatography.

The above ketal (4 g.) is treated with 75% aqueous sulfuric acid at room temperature for 2 hours. The resulting ketone is isolated by dilution with water, followed by ether extraction.

To a solution of 12.5 g. of hydroxylamine hydrochloride in 50 ml. of water and 50 ml. of 10% aqueous sodium hydroxide is added a solution of 5 g. of the above ketone in 75 ml. of 95% alcohol. The mixture is heated at 70–80° for 15 minutes, filtered hot, and then diluted with 250 ml. of cold water. After the solution is cooled, the precipitate is filtered off, and the oxime product purified by recrystallization.

To a slurry of 1.75 g. of lithium aluminum hydride in 150 ml. of refluxing tetrahydrofuran is added over a 15 minute period a solution of 3.5 g. of this oxime in 75 ml. of dry tetrahydrofuran. The mixture is refluxed for 3 hours, cooled, and the excess hydride decomposed by dropwise addition of saturated aqueous sodium sulfate. The resulting white slurry is filtered off, the filter cake washed with ether, and the combined filtrates diluted with a mixture of 10 ml. of conc. hydrochloric acid and 20 ml. of water. The volatile solvents are removed by evaporation in vacuo, the aqueous residue basified with 10% aqueous sodium hydroxide, and then extracted with ether. The dried ether solution is evaporated to give the title product.

EXAMPLE 5

3-aminopentacyclo[6.2.0.0$^{2,6}$.0$^{3,10}$.0$^{5,9}$]decane

A solution of methyl dicyclopentadiene-2-carboxylate (13.5 g., 0.072 mole) in 450 ml. of acetone, all contained in a quartz immersion photolysis apparatus, is irradiated for 18 hours with a 450 watt Hanovia Hg vapor lamp. The acetone is removed in vacuo and the liquid residue heated in a refluxing solution of potassium hydroxide (27 g.) in a mixture of water (27 ml.) and methanol (420 ml.). After 4 hours the solvent is removed in vacuo and the residue dissolved in 500 ml. of water. The alkaline solution is extracted with ether and then acidified with dilute hydrochloric acid. The oily suspension is extracted with ether, the combined extracts dried over anhydrous magnesium sulfate and evaporated to a pale yellow syrup (14 g.). The syrup is dissolved in ether, treated with a slight excess of cyclohexylamine and the precipitated salt collected. The free acid is regenerated from the cyclohexylamine salt to give a pale yellow semisolid residue. Sublimation at 100–120°/0.1 mm. gives 6.1 g. of pentacyclo[6.2.0.0$^{2,6}$.0$^{3,10}$.0$^{5,9}$]decane-3-carboxylic acid, M.P. 66–69°. A sample is recrystallized from petroleum ether, M.P. 66–69°.

Pentacyclo[6.2.0.0$^{2,6}$.0$^{3,10}$.0$^{5,9}$]decane-3-carboxylic acid (10.1 g., 0.059 mole) is dissolved in a mixture of 325 ml. of chloroform and 86 ml. of concentrated sulfuric acid. The mixture is stirred and maintained between 45–50° while sodium azide (5.8 g., 0.089 mole) is added in portions during 35 minutes. The mixture is stirred at 50° for 1 hour then poured onto 600 g. of crushed ice. After 1 hour, the organic layer is separated and the aqueous layer basified with 10% aqueous sodium hydroxide. The alkaline solution is extracted with ether, the combined extracts dried over anhydrous magnesium sulfate and then evaporated to give the title 3-aminopentacyclodecane product. The product is dissolved in ether and then treated with excess ethereal hydrogen chloride. Recrystallization from isopropyl alcohol-ethyl acetate gives the pure hydrochloride, M.P. 300–2° dec.

EXAMPLE 6

2-aminopentacyclo[6.2.0.0$^{2,6}$.0$^{3,10}$.0$^{5,9}$]decane

A solution of methyl dicyclopentadiene-5-(or 6)-carboxylate (3.2 g., 0.017 mole) in 450 ml. of acetone is irradiated in a quartz immersion apparatus for 20 hours with a 450 watt Hanovia Hg vapor lamp. Following the precedure described for the synthesis of pentacyclo[6.2.0.0$^{2,6}$.0$^{3,10}$.0$^{5,9}$]decane-3-carboxylic acid as in Example 5 gives crude 2-carboxylic acid. Sublimation at 110°/0.1 mm. gives 0.60 g. of acid, M.P. 87–90°. One recrystallization from petroleum ether gives the pure product, M.P. 90–2°.

The title 2-aminopentacyclodecane compound is prepared by treating 1.55 g. of pentacyclo[6.2.0.0$^{2,6}$.0$^{3,10}$.0$^{5,9}$]decane-2-carboxylic acid according to the procedure described in Example 5. The hydrochloride salt melts at 310–14° dec.

EXAMPLE 7

4-aminopentacyclo[6.2.0.0$^{2,6}$.0$^{3,10}$.0$^{5,9}$]decane

To a solution of hydroxylamine hydrochloride (37.5 g.) in water (150 ml.) and 10% aqueous sodium hydroxide (150 ml.) is added a solution of pentacyclo[6.2.0.0$^{20}$.0$^{3,10}$.0$^{5,9}$]decan-4-one (15 g.) [R. C. Cookson, J. Herdec and R. O. Williams, Tetrahedron Letters, 29 (1960)] in 200 ml of 95% alcohol. The mixture is heated at 70–80° for 15 minutes filtered hot, and then diluted with 700 ml. of cold water. After the solution is cooled, the precipitate is collected and air dried. The crude solid is purified by sublimation under vacuum, to give pentacyclo[6.2.0.0$^{2,6}$.0$^{3,10}$.0$^{5,9}$]decan-4-one oxime, M.P. 98–100°.

Analysis.—Calcd. for $C_{10}H_{11}NO$ (percent): C, 74.51; H, 6.88; N, 8.69. Found (percent): C, 74.56; H, 6.93; N, 8.65.

To a slurry of lithium aluminum hydride (3.5 g.) in 300 ml. of boiling tetrahydrofuran is added during 20 minutes a solution of pentacyclo[6.2.0.0$^{26}$.0$^{3,10}$.0$^{5,9}$]decan-4-one oxime (7 g.) in 150 ml. of dry tetrahydrofuran. The mixture is heated at reflux for 3 hours, cooled to room temperature, and excess lithium aluminum hydride decomposed by dropwise addition of saturated aqueous sodium sulfate. The resulting white slurry is filtered, the filter cake washed with ether, and the combined filtrates diluted with a mixture of conc. hydrochloric acid (15 ml.) and water (35 ml.). The volatile solvents are removed by heating in vacuo, the aqueous residue basified with 10% aqueous sodium hydroxide, and extracted with ether. The dried ether solution is evaporated to give the title product. An ether solution of this product is treated with excess ethereal hydrogen chloride to precipitate a white hydrochloride (5.5 g.). One recrystallization from isopropyl alcohol-ethyl acetate gives the amine hydrochloride, M.P. >300°.

Analysis.—Calcd. for $C_{10}H_{14}ClN$ (percent): C, 65.39; H, 7.68; N, 7.62; Cl, 19.30. Found (percent): C, 65.55; H, 7.76; N, 7.75; Cl, 19.35.

EXAMPLE 8

1-aminopentacyclo[4.2.0.0$^{2,5}$.0$^{3,8}$.0$^{4,7}$]octane

Pentacyclo[4.2.0.0$^{2,5}$.0$^{3,8}$.0$^{4,7}$]octane-1-isocyanate, prepared as described in Example 1, is dissolved in dry benzene, a slight excess of benzyl alcohol added and the mixture heated at reflux for 4 hours. The solvent is then removed by heating in vacuo to give the 1-benzyloxycarbonylaminopentacyclooctane.

The above benzyl urethan is dissolved in methanol, 10% palladium-on-carbon added, and the mixture hydrogenated on a Parr apparatus at 60 p.s.i. for 2 hours. The catalyst is filtered off, the solvent removed in vacuo to give the title 1-aminopentacyclooctane product. This compound is dissolved in ether. Treatment with ethereal hydrogen chloride gives the hydrochloride salt.

EXAMPLE 9

3-aminomethylpentacyclo[5.2.0.0$^{2,5}$.0$^{3,9}$.0$^{4,8}$]nonane

A solution of pentacyclo[5.2.0.0$^{2,5}$.0$^{3,9}$.0$^{4,8}$]nonane-3-carboxylic acid (5 g.) in thionyl chloride (25 ml.) is refluxed for 1 hour and then allowed to stand overnight at room temperature. After refluxing an additional hour, excess thionyl chloride is removed in vacuo. The haycolored residual oil is taken up in benzene (10 ml.) and the solution evaporated in vacuo to give the acid chloride as an oil.

The crude acid chloride is dissolved in dry tetrahydrofuran (15 ml.) and the solution added dropwise during 2–3 minutes to an ice-cold solution of concentrated aqueous ammonia (75 ml.). After stirring 1 hour, water (25 ml.) is added, and the precipitate collected by filtration. One recrystallization from 1:1 acetonitrile-isopropyl alcohol gives the 1-carboxamide product, M.P. 261–263°.

Analysis.—Calcd. for $C_{10}H_{11}NO$ (percent): C, 74.51; H, 6.88; N, 8.69. Found (percent): C, 74.65; H, 7.06; N, 8.74.

To a slurry of lithium aluminum hydride (3.04 g.) in boiling tetrahydrofuran (400 ml.) is added portionwise over 1 hour 3 g. of the above amide, all under nitrogen. The mixture then is heated at reflux for 46 hours, cooled, and excess lithium aluminum hydride decomposed by dropwise addition of saturated aqueous sodium sulfate. The resulting white slurry is filtered, the filter cake washed with ether, and the combined filtrates evaporated in vacuo. The liquid residue is boiled with ether, a small amount of water separated, and the ether layer dried. Evaporation of the ether gives the title 3-aminomethyl product. Treatment of an ether solution of the product with ethereal hydrogen chloride gives a white hydrochloride which is recrystallized from isopropyl alcohol, M.P. >300°.

Analysis.—Calcd. for $C_{10}H_{14}ClN$ (percent): C, 65.39; H, 7.68; N, 7.63; Cl, 19.30. Found (percent): C, 65.54; H, 7.65; N, 7.54; Cl, 19.03.

EXAMPLE 10

When the following acids are converted to the corresponding acid chlorides by means of thionyl chloride, then treated with ice cold concentrated aqueous ammonia to form the corresponding amide, and then reduced with lithium aluminum hydride, all in accordance with the procedure of Example 9, the following listed aminomethyl compounds are obtained, respectively.

Acids:
Pentacyclo[6.2.0.0$^{2,6}$.0$^{3,10}$.0$^{5,9}$]decane-3 - carboxylic acid
Pentacyclo[6.2.0.0$^{2,6}$.0$^{3,10}$.0$^{5,9}$]decane - 2-carboxylic acid
Pentacyclo[4.2.0.0$^{2,5}$.0$^{3,8}$.0$^{4,7}$]octane - 1 - carboxylic acid Aminomethyl compounds:
3-aminomethylpentacyclo[6.2.0.0$^{2,6}$.0$^{3,10}$.0$^{5,9}$]decane
2-aminomethylpentacyclo[6.2.0.0$^{2,6}$.0$^{3,10}$.0$^{5,9}$]decane
1-aminomethylpentacyclo[4.2.0.0$^{2,5}$.0$^{3,8}$.0$^{4,7}$]octane

EXAMPLE 11

4-aminomethylpentacyclo[6.2.0.0$^{2,6}$.0$^{3,10}$.0$^{5,9}$]decane

A stirred suspension of methoxymethyl triphenyl phosphonium chloride (40 g., 0.105 mole) in tetrahydrofuran (200 ml.) is treated dropwise with ethereal butyl lithium (105 ml., 0.10 mole) in a nitrogen atmosphere and allowed to stir at 25° for 3 hours. To the resulting deep red solution is added dropwise a solution of pentacyclo[6.2.0.0$^{2,6}$.0$^{3,10}$.0$^{5,9}$]decan - 4 - one (7.3 g., 0.05 mole) in tetrahydrofuran (40 ml.) and diglyme (40 ml.). After stirring 4 hours at 25°, the tetrahydrofuran is removed by heating on a steam bath. Diglyme (200 ml.) is added and the mixture heated at reflux for 7 hours. The mixture is then cooled, concentrated to one-half volume in vacuo, and treated with methyl bromoacetate to remove any triphenylphosphine. After standing 12 hours, the solid is filtered off and the filtrate washed with water. Evaporation of the dry organic layer gives, after alumina column chromatography, 4 - methoxymethylene pentacyclo[6.2.0.0$^{2,6}$.0$^{3,10}$.0$^{5,9}$]decane.

The vinyl ether is allowed to stand 15 minutes at room temperature in a saturated solution of ether in perchloric acid, poured into aqueous sodium bicarbonate and extracted with ether. Evaporation of the dry ether layer gives the 4-carboxaldehyde. The aldehyde is converted to the oxime by treatment with hydroxylamine hydrochloride according to the procedure of Example 4, and the oxime is reduced with lithium aluminum hydride according to the procedure of Example 4, to give the 4-aminomethyl product.

EXAMPLE 12

α-Methylpentacyclo[5.2.0.0$^{2,5}$.0$^{3,9}$.0$^{4,8}$]nonane-3-methylamine

Pentacyclo[5.2.0.0$^{2,5}$.0$^{3,9}$.0$^{4,8}$]nonane - 3 - carboxylic acid (4.95 g.) is dissolved in 100 ml. of dry tetrahydrofuran and, with stirring under nitrogen, 31 ml. (0.062 mole) of 2 N methyl lithium in ether is added over 3 to 4 minutes. The mixture is refluxed overnight and cooled to room temperature. Water (25 ml.) is added, and the product extracted into ether. After drying over magnesium sulfate, the ether is removed to yield pentacyclo[5.2.0. 0$^{2,5}$.0$^{3,9}$.0$^{4,8}$]non-1-yl methyl ketone.

To a mixture of 5.8 g. of the ketone, 3.22 g. (0.0463 mole) of hydroxylamine hydrochloride, and 15 ml. of ethanol are added, portionwise with stirring, 3 ml. of water and 5.9 g. (0.147 mole) of powdered sodium hydroxide. The reaction mixture is stirred and refluxed for 5 minutes and then poured into an ice cold solution of 20 ml. (0.240 mole) of concentrated hydrochloric acid in 110 ml. of water. The colorless solid is filtered and washed with water. By drying over phosphorous pentoxide, the oxime is obtained.

A solution of 3.84 g. of the oxime in 50 ml. of tetrahydrofuran is added to a stirred suspension of 2.93 g. (0.077 mole) of lithium aluminum hydride in 75 ml. of ether. The mixture is stirred and refluxed overnight. After cooling to room temperature, 7 ml. (7.0 g., 0.0389 mole) of water is added dropwise, and the mixture stirred 1 hour at room temperature. The solid is filtered and washed well with ether. The ether is dried with solid potassium hydroxide and then with magnesium sulfate, and the product is obtained by evaporation of the ether. A hydrochloride salt is prepared by passing dry hydrogen chloride into an ether solution of the product amine. Use of equivalent amounts of other lower alkyl lithiums instead of methyl lithium results in the formation of other α-lower alkyl derivatives.

EXAMPLE 13

α,α-Dimethylpentacyclo[6.2.0.0$^{2,6}$.0$^{3,10}$.0$^{5,9}$]decane-3-methylamine To a solution of 32.1 g. of pentacyclo[6.2.0.0$^{2,6}$.0$^{3,10}$. 0$^{5,9}$]decane-3-carboxylic acid chloride (prepared from the acid and thionyl chloride) in 500 ml. of anhydrous ether under a nitrogen atmosphere is added, dropwise, 150 ml. of commercial 3 M methyl magnesium bromide at a rate which maintains a gentle reflux. The reaction mixture is heated for 1 hour after the addition, then cooled. To decompose the metal complex, 300 ml. of saturated ammonium chloride is added. The ether layer is separated and the aqueous layer is extracted with 100 ml. of chloroform. This extract is combined with the ether layer, and the mixture is dried with anhydrous magnesium sulfate and vacuum-concentrated to dryness at 35° C. The residue is steam-distilled until the distillate is no longer milky, about 3 liters of distillate being collected. After cooling, the steam distillate is extracted with two 250 ml. portions of ether, which are combined, dried with anhydrous magnesium sulfate, and vacuum concentrated to yield α,α-dimethylpentacyclo[6.2.0.0$^{2,6}$.0$^{3,10}$.0$^{5,9}$]decane - 3 - methanol.

A 35 ml. amount of concentrated sulfuric acid is added dropwise, with cooling to hold the temperature below 10° C., to 160 ml. of acetonitrile. Then, 21.3 g. of the α,α-dimethyl methanol is added. The temperature is raised to 48° C., for 45 minutes. The reaction mixture is allowed to cool to room temperature and is then slowly poured into 1000 ml. of ice water. The solids which separate are filtered and dried and then taken up in 500 ml. of ether. Dry hydrogen chloride is bubbled into the ether solution until no further precipitation occurs. The solids are filtered, dried, and placed in a separatory funnel containing 200 ml. of water and 500 ml. of ether. This is shaken until the solids dissolve, and the aqueous layer is separated and discarded. The ether solution is dried with anhydrous sodium sulfate and concentrated to dryness to give N-acetyl-α,α-dimethylpentacyclo[6.2.0.0$^{2,6}$.0$^{3,10}$.0$^{5,9}$]decane - 3 - methylamine.

A mixture of 2.85 g. of the N-acetyl compound, 10 g. of potassium hydroxide, and 40 ml. of methanol is heated at about 225° in a sealed tube for 18 hours and then cooled. The contents are added to 100 ml. of water and the mixture is extracted with 2–50 ml. portions of ether. The extracts are combined, dried with potassium hydroxide pellets, and the ether is evaporated to give the title α,α-dimethyl methylamine product.

A hydrochloride salt is prepared in the usual manner with dry hydrogen chloride.

EXAMPLE 14

Pentacyclo[6.2.0.0$^{2,6}$.0$^{3,10}$.0$^{5,9}$]decane-4-carboxylic acid

To a solution of 2.88 g. of pentacyclo[6.2.0.0$^{2,6}$.0$^{3,10}$. 0$^{5,9}$]decane-4-carboxaldehyde (Example 11) and 11.32 g. of silver nitrate in a mixture of 45 ml. of water and 35 ml. of absolute ethanol is added, dropwise with stirring over a 2 hour period, a solution of 4.2 g. of sodium hydroxide in 75 ml. of water. The resulting mixture is stirred overnight, filtered, extracted with ether, acidified, and again extracted with ether. Drying and evaporation of the ether gives the 4-carboxylic acid. This acid is used for preparing the various α-methylamine derivatives.

The pentacyclo[5.2.0.0$^{2,5}$.0$^{3,9}$.0$^{4,8}$]nonane-6-carboxylic acid is prepared by converting the 6-one (Example 4) to the carboxaldehyde according to the procedure of Example 11, and oxidizing the aldehyde to the acid as described in this example.

EXAMPLE 15

3-acetamidopentacyclo[6.2.0.0$^{2,6}$.0$^{3,10}$.0$^{5,9}$]decane

3 - aminopentacyclo[6.2.0.0$^{2,6}$.0$^{3,10}$.0$^{5,9}$]decane (2.94 g.) is allowed to stand overnight with 5 g. of acetic anhydride in 100 ml. of pyridine. The reaction mixture is then diluted with ice water and the product removed by filtration.

EXAMPLE 16

3-ethylaminopentacyclo[6.2.0.0$^{2,6}$.0$^{3,10}$.0$^{5,9}$]decane

A solution of 1.9 g. of the acetamido compound of Example 15 in 100 ml. of dry tetrahydrofuran is refluxed with 0.5 g. of lithium aluminum hydride for 12 hours. The excess hydride and the metal complex are decomposed by the addition of a solution of acetone and water, the mixture is filtered, and the filtrate evaporated to give the product.

EXAMPLE 17

3-(N-methylacetamido)pentacyclo[6.2.0.0$^{2,6}$.0$^{3,10}$.0$^{5,9}$]decane

A solution of 1.9 g. of the acetamido compound of Example 15 in 50 ml. of tetrahydrofuran is refluxed for two hours with 0.45 g. of 53.5% sodium hydride. A solution of 1.6 g. of methyl iodide in 25 ml. of tetrahydrofuran is added to the cooled reaction mixture which is then refluxed for twelve hours. The reaction mixture is filtered, the filtrate evaporated in vacuo, and water is cautiously added. The alkaline solution is extracted with ether, and the ether extracts dried and evaporated to give the title product.

Reduction of the title product with lithium aluminum hydride gives the methylethylamino compound.

EXAMPLE 18

3-methylaminopentacyclo[5.2.0.0$^{2,5}$.0$^{3,9}$.0$^{4,8}$]nonane

Pentacyclo[5.2.0.0$^{2,5}$.0$^{3,9}$.0$^{4,8}$]nonane-3-isocyanate (3.2 g., Example 2) is dissolved in 60 ml. of methanol and is then refluxed for 2 hours. The solvent is evaporated in vacuo, 50 ml. of dry tetrahydrofuran is added to the resulting carbamate, and the mixture is refluxed with 0.76 g. of lithium aluminum hydride for four hours. The reaction mixture is decomposed with water and filtered, and the filtrate evaporated to give the title product.

EXAMPLE 19

3-dimethylaminopentacyclo[5.2.0.0$^{2,5}$.0$^{3,9}$.0$^{4,8}$]nonane 3-aminopentacyclo[5.2.0.0$^{2,5}$.0$^{3,9}$.0$^{4,8}$]nonane (1.4 g.) is mixed with 0.5 mole of 90% formic acid and 0.22 mole of 35% formaldehyde solution. The mixture is heated for twelve hours on the steam bath, 50 ml. of conc. hydrochloric acid is then added, and the mixture is evaporated to dryness in vacuo. To the residue is added 200 ml. of 1 N sodium hydroxide; the product is extracted with ether, and is obtained as the free base by drying and evaporation.

EXAMPLE 20

2-ureidopentacyclo[6.2.0.0$^{2,6}$.0$^{3,10}$.0$^{5,9}$]decane

To a stirred refluxing solution of 1.9 g. of 2-aminopentacyclo[6.2.0.0$^{2,6}$.0$^{3,10}$.0$^{5,9}$]decane hydrochloride in 100 ml. of water is added dropwise a solution of 8.9 g. of potassium cyanate. The mixture is refluxed for a further hour, cooled, and the crystalline product is collected.

EXAMPLE 21

1-guanidinopentacyclo[4.2.0.0$^{2,5}$.0$^{3,8}$.0$^{4,7}$]octane

A mixture of 1.2 g. of 1-aminopentacyclo[4.2.0.0$^{2,5}$.0$^{3,8}$.0$^{4,7}$]octane and 0.1 mole of S-methyl-isothiourea sulfate in 50 ml. each of water and ethanol is refluxed for twenty hours. Evaporation in vacuo gives the title product as its sulfate.

EXAMPLE 22

3-ethoxycarbonylaminopentacyclo[5.2.0.0$^{2,5}$.0$^{3,9}$.0$^{4,8}$]nonane

Pentacyclo[5.2.0.0$^{2,5}$.0$^{3,9}$.0$^{4,8}$]nonane - 3 - isocyanate (Example 2) is dissolved in benzene, a slight excess of absolute ethyl alcohol added and the solution heated at reflux for 4 hours. The solvent is removed by heat in vacuo to give the title product.

Use of methanol or butanol results in the formation of the methoxycarbonyl or butoxycarbonyl products, respectively.

EXAMPLE 23

When propionic anhydride, butyryl chloride, or benzoyl chloride are substituted for the acetic anhydride in Example 15, the corresponding propionamido, butyramido, or benzamido compounds, respectively, are obtained. Reduction of the propionamido or butyramido compounds with lithium aluminum hydride as in Example 16 results in the formation of the propyl or butyl compound, respectively.

We claim:
1. A compound having the structure

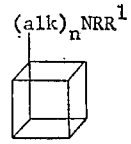

where
alk is

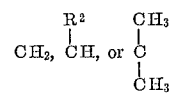

$n$ is 0 or 1;
R is hydrogen or lower alkyl;
R$^1$ is hydrogen or lower alkyl; and
R$^2$ is lower alkyl of 1 to 4 carbon atoms;
or a pharmaceutically acceptable acid addition salt thereof.

2. A compound as claimed in claim 1, where R and R$^1$ are hydrogen or methyl and R$^2$ is methyl.

3. A compound as claimed in claim 2, where R and R$^1$ are hydrogen, and $n$ is 0, said compound having the structure

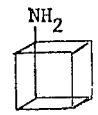

or the hydrochloride salt thereof.

4. A compound as claimed in claim 2, where R and R$^1$ are hydrogen, alk is $CH_2$, and $n$ is 1, said compound having the structure
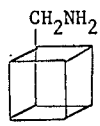
or the hydrochloride salt thereof.
References Cited
UNITED STATES PATENTS
3,418,368  12/1968  Dunn et al. _____ 260—563
CHARLES B. PARKER, Primary Examiner
D. R. PHILLIPS, Assistant Examiner
U.S. Cl. X.R.
260—340.9, 468, 501.1, 501.12, 514, 553, 557, 564, 566, 586; 424—315, 316, 325